E. MARTIN.
PICKER TOOTH FOR SHOCK LOADERS, &c.
APPLICATION FILED MAY 15, 1917.
1,258,351.
Patented Mar. 5, 1918.
2 SHEETS—SHEET 1.
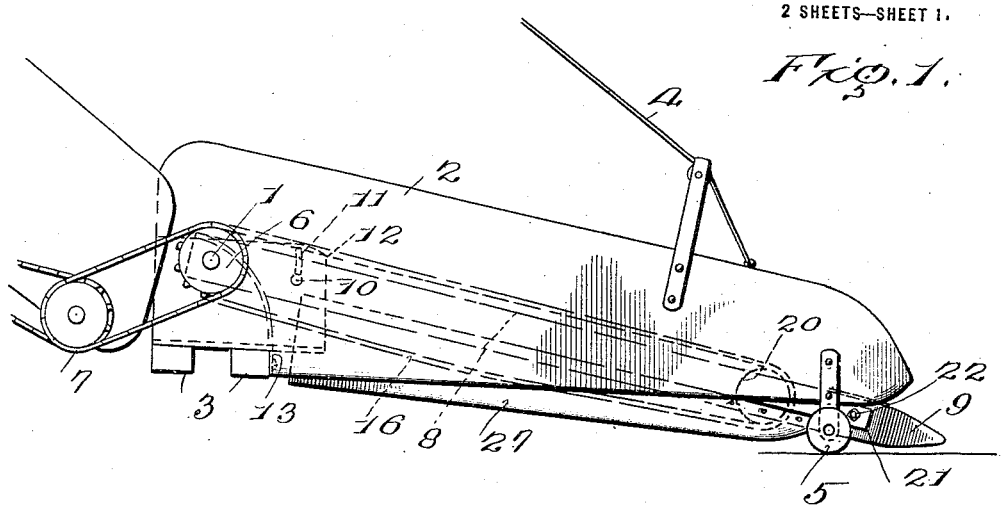
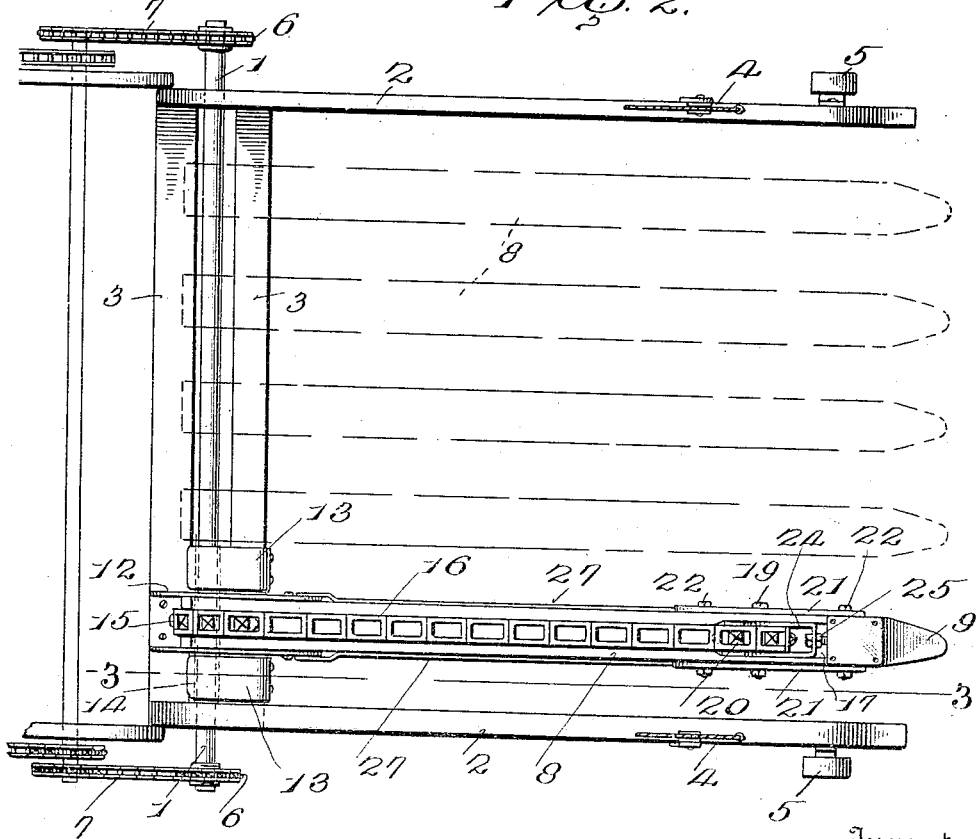
Inventor
Edward Martin
By
Attorneys

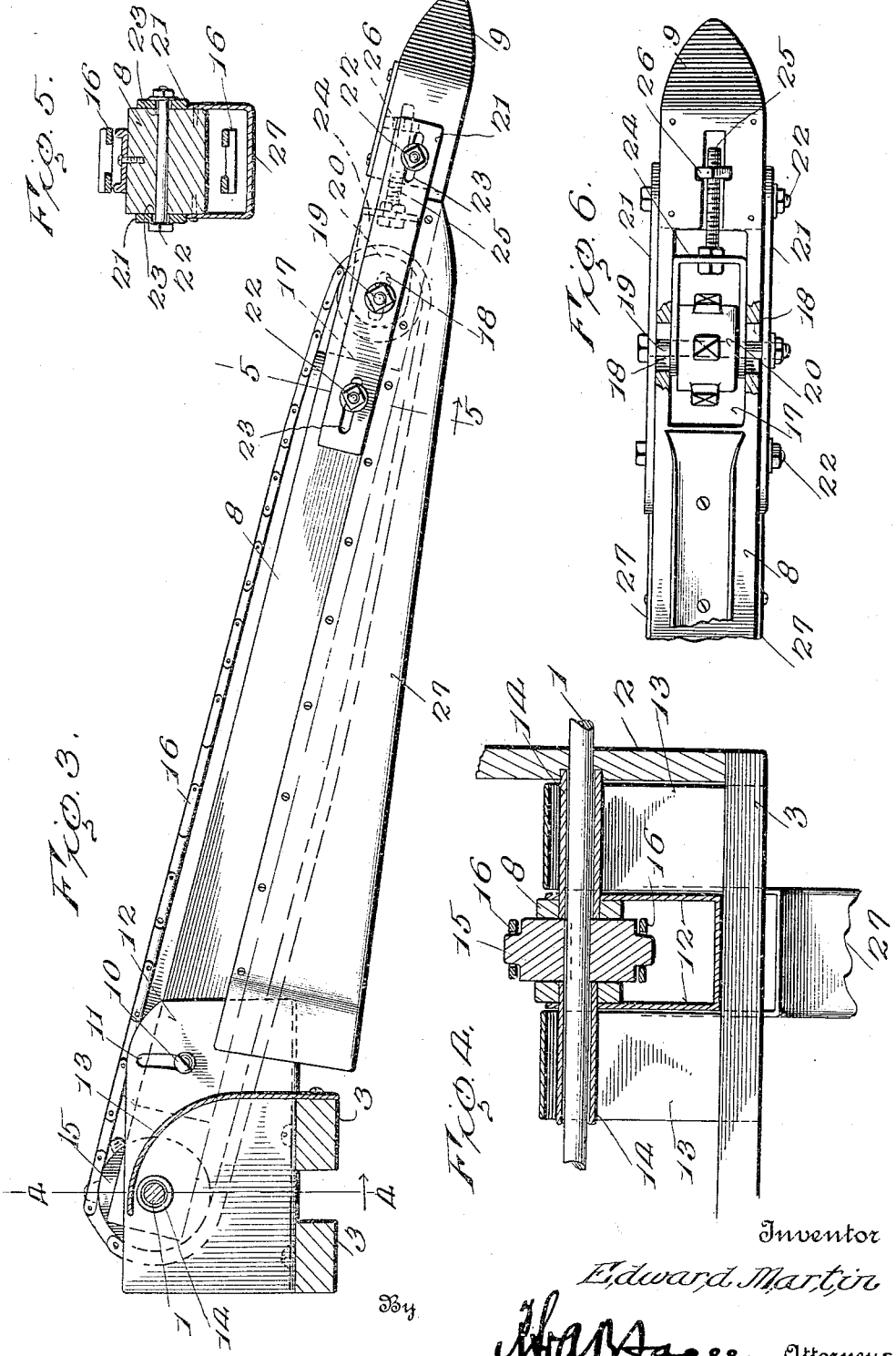

UNITED STATES PATENT OFFICE.

EDWARD MARTIN, OF COLWICH, KANSAS.

PICKER-TOOTH FOR SHOCK-LOADERS, &c.

1,258,351. Specification of Letters Patent. Patented Mar. 5, 1918.

Application filed May 15, 1917. Serial No. 168,770.

*To all whom it may concern:*

Be it known that I, EDWARD MARTIN, a citizen of the United States, residing at Colwich, in the county of Sedgwick and State of Kansas, have invented certain new and useful Improvements in Picker-Teeth for Shock-Loaders, &c., of which the following is a specification.

This invention relates to loaders or machines for taking hay, wheat, or other bundles from a field and delivering them to conveyers or other mechanism, and has special reference to teeth which travel upon the ground in advance of the other mechanism and pick up the grain or bundles. The primary object of the invention is to provide a tooth of novel construction and arrangement which will automatically yield to irregularities in the surface of the ground, each tooth being independent of all the other teeth so that the progress of the machine will be unobstructed and the material will be easily taken up. Secondary objects of the invention are to provide means for maintaining the proper tension of the conveyers which coöperate with the several teeth, to provide means for protecting said conveyers from injurious contact with the ground, and to provide means whereby the conveyers may be positively driven without interfering with the automatic adjustment of the teeth to the surface over which they travel.

The invention is illustrated in the accompanying drawings and will be hereinafter fully described, the novel features being subsequently pointed out in the appended claims, and in the drawings—

Figure 1 is an elevation of a portion of a loading apparatus showing my improvements applied thereto;

Fig. 2 is a plan view of the same;

Fig. 3 is an enlarged elevation of the tooth and the parts immediately coöperating therewith;

Fig. 4 is a transverse section on the line 4—4 of Fig. 3;

Fig. 5 is a transverse section on the line 5—5 of Fig. 3;

Fig. 6 is a detail plan view of the forward portion of one of the teeth.

In carrying out my invention, I employ a shaft 1 which is journaled in side plates or guards 2 which are rigidly secured to the frame of the machine, a portion of which is shown at 3. The side plates or guards 2 are relatively fixed and extend above the plane of the upper surface of the picker teeth and the conveyers so that they will prevent the bundles or grain moving laterally and, consequently, passing out of the path of the conveyers and being thereby lost. A cable 4 may be attached to the side plates or guards near the forward ends thereof and extend up to any convenient point so that when the machine is not in operation and is being driven from one field to another field, the teeth may be elevated so that they will not be liable to be injured by contact with passing objects. The side plates may also be provided with supporting rollers 5 near their front ends and the driving shaft 1 will be equipped at either or both ends with a sprocket 6 around which will be trained a chain 7 so that the shaft may be actuated from the ground wheels of the machine or from any other source of motion.

Each picker tooth comprises an elongated body 8 having its front end 9 tapered so as to readily pass under the grain or bundles and the rear end of this body is provided on its sides with pins or studs 10 playing in arcuate slots 11 in the side plates 12 which are secured to the frame of the machine and project upwardly therefrom immediately adjacent the sides of the tooth body 8, thereby preventing movement of the teeth longitudinally of the shaft. The arcuate slots 10 are concentric with the driving shaft 1 so that the body 8 may swing about the said shaft as a center, the pins or studs 10 resting in the lower ends of said slots 11 when the tooth is in its lowest position. As the front end of the tooth rides over a high part of the ground surface, the tooth will be elevated and it will be maintained in its proper position relative to the driving shaft so as to avoid binding thereon by the side plates 12 and, consequently, the machine will not be subjected to sudden stops through the front end of a tooth striking an elevation. Guards or shields 13 are secured upon the frame between adjacent teeth and extend upwardly and rearwardly over the driving shaft, as shown most clearly in Fig. 3, so that the grain will be prevented from falling between the rear ends of the teeth and accumulating so as to choke the operation of the machine. Spacing sleeves 14 are also provided around the driving shaft 1 between the side plates 2 and the several sprockets 15 to maintain the proper positions of the teeth. The sprockets 15 are secured upon the driving shaft 1 and correspond in number to the teeth, each sprocket being disposed within a slot or recess in the rear end of a tooth, as will be readily understood. A conveyer chain 16 of any preferred form is trained around the said sprocket. In the forward portion of each tooth is a longitudinal recess 17 and in the sides of the tooth are longitudinal slots 18 communicating with said recess. A shaft 19 is fitted through the said slots and recesses and carries a sprocket 20 around which the chain 16 is trained. The ends of the shaft 19 are carried by bearing plates 21 which are disposed against the outer sides of the tooth and are supported at their ends by means of bolts 22 inserted transversely through the tooth and through the longitudinal slots 23 in the said plates. The shaft 19 is thus firmly supported and at the same time may be shifted longitudinally of the tooth so as to maintain the tension of the conveyer chain. To effect shifting of the shaft 19 longitudinally of the tooth, I employ a yoke 24 which is disposed within the forward portion of the recess 17 and has its ends fitted to the shaft. A screw or adjusting bolt 25 is swiveled to the shoulder of the yoke 24 and has a threaded engagement with a nut or collar 26 which is fitted within the tooth and is held against longitudinal movement therein. The rotation of the nut will cause the bolt or screw 25 to move forwardly or rearwardly and thereby shift the shaft 19 so as to adjust the sprocket pinion 20 and bring the chain 16 to the desired tension.

It will be readily understood that the lower run of the conveyer chain 16 passes below the body of the tooth. This lower run of chain, if exposed, would be apt to catch in twigs or upon small stones which might be exposed upon the surface of the field and be thereby broken. To avoid such disastrous occurrence, I secure to the body of the tooth a shoe 27 which extends longitudinally of the tooth and depends therefrom, the shoe being U-shaped in cross section and having its sides tapered from its rear end toward its front end so that it may ride upon the ground and support the tooth in the proper position to engage under the grain or bundles, and also extend around and below the chain and prevent contact of the same with the ground.

It is thought the use and advantages of my improved device will be readily understood from the foregoing description taken in connection with the accompanying drawings. The machine is caused to travel over the field in the usual manner and the forward ends of the teeth will take under and pick up the grain or bundles which will fall upon the conveyer chains 16 and be carried by them back to and deposited upon the usual elevator or delivered to other mechanism according to the type of machine to which the tooth is applied. As the teeth meet holes or ruts or elevations in the surface of the field they will drop or rise automatically inasmuch as they are individually pivoted upon the driving shaft and may swing freely in vertical planes about the same. The vertical movement is limited by the engagement of the pins or studs 10 with the ends of the slots 11 so that the teeth cannot be forced so high that they will pass over the grain or bundle and cannot drop so low that they will dig into the ground. Consequently breakage of the teeth or any of the parts directly coöperating therewith will be avoided.

Having thus described the invention, what is claimed as new is:

1. In an apparatus for the purpose set forth, the combination of a support, a shaft mounted therein, picker teeth independently pivoted upon said shaft, and conveyers driven from said shaft and each disposed longitudinally of and mounted within one of the teeth.

2. The combination of a support, a picker tooth pivotally mounted upon the support, side plates secured upon the support at the sides of the tooth and constructed with arcuate slots concentric with the pivot of the tooth, and studs upon the sides of the tooth playing in said slots.

3. The combination of a support, a driving shaft mounted therein, picker teeth independently pivoted upon said shaft, guards secured upon the support between the teeth and extending rearwardly and upwardly over the shaft, and conveyers driven by said shaft and disposed longitudinally within the respective teeth.

4. The combination of a pivotally mounted tooth having a longitudinal recess in its forward portion, a sprocket disposed at the rear end of the tooth concentric with the pivot of the same; a sprocket mounted within the longitudinal recess in the forward portion of the tooth, a conveyer chain trained around the said sprockets, and means mounted in the front end of the tooth for adjusting the forward sprocket longitudinally of the tooth.

5. The combination of a pivotally mounted tooth having a longitudinal recess in its forward portion and provided in its sides with longitudinal slots communicating with said recess, a sprocket disposed at the rear end of the tooth concentric with the pivot of the same, a shaft mounted in the slots in the forward portion of the tooth and extending through the recess therein, a sprocket on said shaft within said recess, a conveyer trained around said sprockets, a yoke disposed within said recess and fitted to said shaft, bearing plates for said shaft disposed against the outer sides of the tooth and supported for longitudinal movement thereon, a bolt swiveled to said yoke and extending longitudinally forward therefrom within the tooth, and a nut engaged upon said screw and rotatably fitted in the tooth but held against movement longitudinally of the tooth.

In testimony whereof I affix my signature.

EDWARD MARTIN [L. S.]